Figure 1:
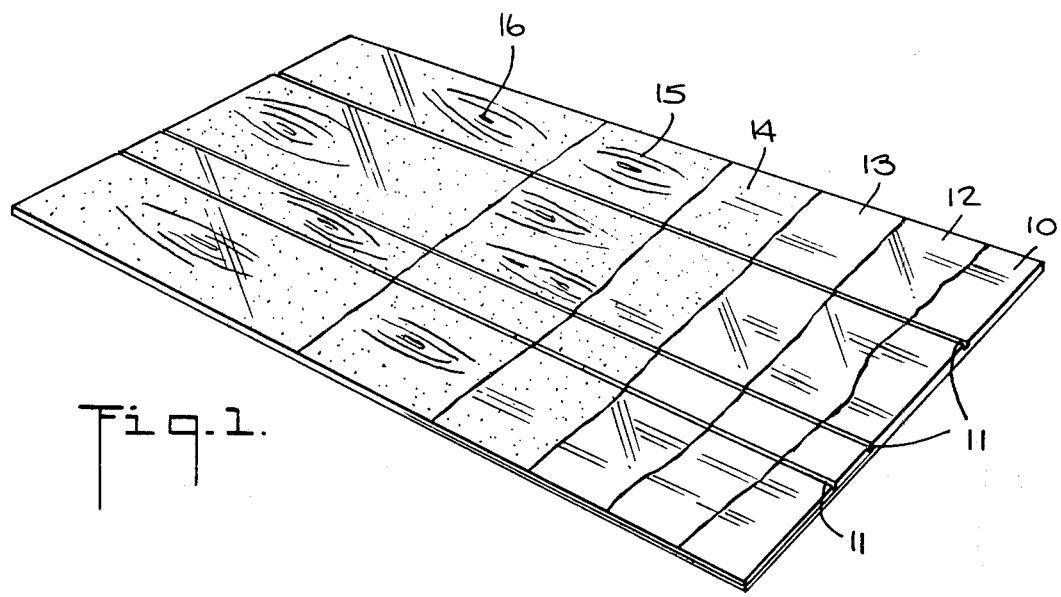

United States Patent [19]

Cooley et al.

[11] 4,068,031
[45] Jan. 10, 1978

[54] LAUAN PANEL WITH REDUCED FLAME SPREAD RATING

[75] Inventors: James Cooley; Ozzie Fogle; Hildred Barnes, all of Orangeburg, S.C.

[73] Assignee: Champion International Corporation, Stamford, Conn.

[21] Appl. No.: 638,943

[22] Filed: Dec. 8, 1975

Related U.S. Application Data

[63] Continuation-in-part of Ser. No. 492,138, July 26, 1974, abandoned.

[51] Int. Cl.² .......................... B32B 3/00; B27K 3/16
[52] U.S. Cl. .................................. 428/163; 427/258; 427/270; 427/408; 428/151; 428/168; 428/204; 428/207; 428/537; 428/921
[58] Field of Search .................. 427/408, 258, 270; 428/921, 537, 204, 207, 163, 168; 106/15 AP; 252/8.1

[56] References Cited

U.S. PATENT DOCUMENTS

| | | | |
|---|---|---|---|
| 1,397,858 | 11/1921 | Craig | 427/343 |
| 1,738,976 | 12/1929 | Vivas | 427/343 |
| 1,926,253 | 9/1933 | Allen | 427/408 |
| 2,357,068 | 8/1944 | Barab | 106/15 PP |
| 2,829,067 | 4/1958 | Eastland | 427/408 |
| 3,371,058 | 2/1968 | Perrizolo | 260/29.1 |
| 3,479,197 | 11/1969 | Mork | 427/408 |
| 3,560,242 | 2/1971 | Urata | 427/408 |
| 3,682,673 | 8/1972 | Meyers | 427/408 |

OTHER PUBLICATIONS

Lyons, 1970, The Chemistry & Uses of Fire Retardants, pp. 124–127.

Primary Examiner—George F. Lesmes
Assistant Examiner—Stanley S. Silverman
Attorney, Agent, or Firm—Evelyn M. Sommer

[57] ABSTRACT

The flame spread rating of Lauan plywood panels is reduced significantly by incorporating, just prior to application, a quantity of sodium bicarbonate in dry powder form or slurry and a quantity of a saturated aqueous solution of sodium tetraborate, respectively, in the water base filler and the water base basecoat used to finish the surface thereof.

10 Claims, 2 Drawing Figures

U.S. Patent     Jan. 10, 1978     4,068,031

LAUAN PANEL WITH REDUCED FLAME SPREAD RATING

This application is a continuation-in-part of application Ser. No. 492,138, filed July 26, 1974, for "Lauan Panel With Reduced Flame Spread Rating," assigned to the same assignee and now abandoned.

The present invention relates to plywood panels, particularly those made from Lauan. More specifically, the invention relates to a panel of the foregoing description having a reduced flame spread rating and to the method of fabricating same.

In order to be acceptable for use in building construction, wood paneling must comply with certain underwriter specifications. One such specification deals with surface burning characteristics, and, for general use as a building material, paneling must have at least a class III rating. That is, the flame spread rating must be no greater than 200 as determined by the ASTM test standard E 84.

Heretofore, in the preparation of Lauan panels the raw Lauan was provided with a finished surface. To this end, the raw Lauan was coated with a water base filler, sanded, coated with a latex material to color the grooves, basecoated with a latex material, printed with lacquer inks, and coated with a final protective coating of alkyd urea as a topcoat finish.

With the foregoing in mind, it is an object of the present invention to produce a plywood panel, particularly of Lauan, having a flame spread rating below 200. It is a further object of the present invention to provide a simple and economical process for achieving the foregoing results.

In accordance with one aspect of the present invention, a plywood panel with a reduced flame spread rating, having a plywood substrate and a decorative surface coating thereon, is provided by arranging for said coating to include in separate layers dispersed sodium bicarbonate and dispersed borax.

In accordance with a further aspect of the present invention there is provided a method for finishing the surface of Lauan plywood panels by applying in sequence to said surface a water base filler, a groove colorant, a water base basecoat, at least one printing ink, and a topcoat, which method is characterized by the improvement of adding just before use to the water base filler from 30 to 40 percent by weight of sodium bicarbonate in dry powder form or slurry and to the water base basecoat from 10 to 15 percent by weight of a saturated aqueous solution of sodium tetraborate, i.e., a borax solution.

Figure 2:
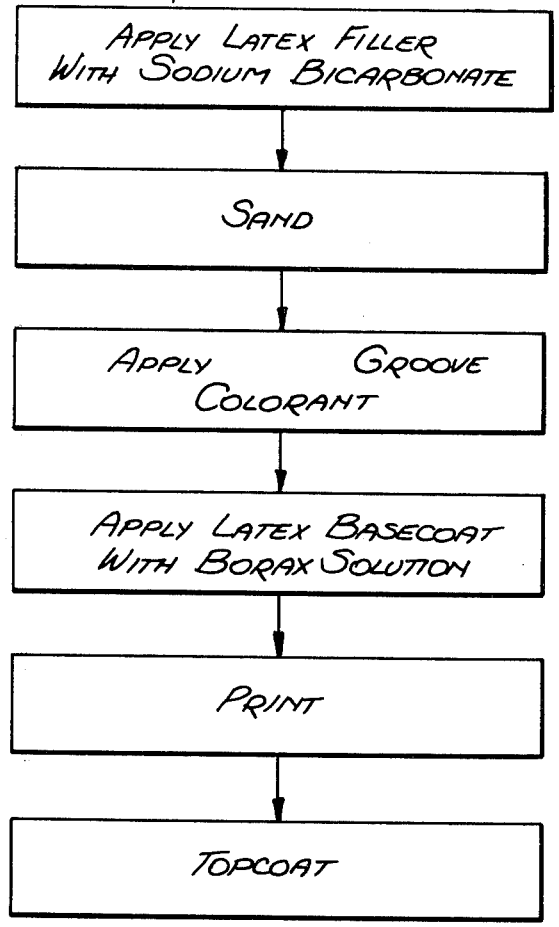

The invention will be better understood after reading the following detailed description of the presently preferred embodiment thereof with reference to the appended drawings in which:

FIG. 1 is a view of a Lauan panel, represented somewhat diagrammatically, showing the various coatings applied to the surface thereof; and FIG. 2 is a process flow chart showing the steps in finishing the surface of the panel of FIG. 1.

Reference should now be had to the drawings wherein FIG. 1 shows pictorially the various coatings applied to the surface of a Lauan plywood panel 10, having longitudinal surface grooves 11 therein, for providing the panel with a decorative and protective surface. It should be understood that while discrete layers of material are shown in FIG. 1, this is only for purpose of pictorial representation since due to the pentration of the coating materials into the pores and fibers of the wood, discrete and discernible continuous layers may not be physically evident.

Finishing of the panel 10 with grooves 11 is accomplished in the following manner. A water base filler, augmented in a manner to be described, is applied, preferably with a reverse rollcoater. The filler is represented as layer 12. After drying and sanding a layer 13 of water base or solvent base coloring material, a groove flood, is applied by a reverse rollcoater or by spraying to color the grooves 11. Next, there is applied to the panel by direct rollcoating a water base basecoat, augmented in a manner to be described, to provide a layer 14. When the basecoat layer 14 is dry it is imprinted with one or more coats of ink or inks commonly known in the art of wood grain printing to create a decorative imitation wood grain appearance or the like in a layer 15. Finally, the surface is protected with a layer 16 of an alkyd urea or water base topcoat material applied by direct rollcoating.

In order to improve the flame spread rating of the panels, sodium bicarbonate in dry powder form or as a slurry is added to the water base filler to augment the latter just before application to the paneling. In addition, a saturated aqueous solution of sodium tetraborate, i.e., borax solution, is added to the water base basecoat to augment the latter just before application to the panel.

With the use of about 30 percent by weight of sodium bicarbonate relative to the weight of water base filler and about 10 percent by weight of the aqueous solution of sodium tetraborate relative to the weight of water base basecoat an average flame spread rate of 187 was obtained. The flame spread rate may be reduced from 20 to 30 points by using from 30 to 40 percent by weight of sodium bicarbonate and from 10 to 15 percent by weight of borax solution. Upon application of the augmented coatings to the panel and drying, sodium bicarbonate will be present in the filler layer in the range of about 38 to 51 percent by weight of cured filler material while borax will be present in the basecoat layer in the range of about 1 to 3% by weight of cured basecoat material.

In fabricating the aforementioned panels, the substrate thicknesses employed were 3.6 mm and 4.0 mm. However, improved results should be obtainable with any normal thickness of paneling.

Having described the presently preferred embodiment of the invention, it will be understood that various changes may be made therein without departing from the true spirit of the invention as defined in the appended claims.

What is claimed is:

1. In the method of finishing the surface of Lauan plywood panels by applying in sequence to said surface a water base filler, a groove colorant, a water base basecoat, at least one printing ink, and a topcoat, the improvement of adding just before use to said water base filler about from 30 to 40 percent by weight of sodium bicarbonate in dry powder form or slurry and to said water base basecoat about from 10 to 15 percent by weight of a saturated aqueous solution of sodium tetraborate.

2. The improvement according to claim 2, wherein said sodium bicarbonate is used in an amount of about 30 percent by weight and said solution of sodium tetraborate is used in an amount of about 10% by weight.

3. The method for reducing the flame spread rating of Lauan plywood panels which comprises incorporating, just prior to the application thereof, about from 30 to 40 percent by weight of sodium bicarbonate in dry powder form or slurry into a water base filler, and about from 10 to 15 percent by weight of a saturated aqueous solution of sodium tetraborate into a water base basecoat, and finishing the surface of said panels by applying thereto said filler and basecoat.

4. In a plywood panel comprising a plywood substrate having a first filler layer and a second basecoat layer thereon, the improvement which comprises from about 38 to 51 percent of sodium bicarbonate by weight of cured water-base filler material dispersed in said first layer and from about 1 to 3 percent of borax by weight of cured water-base basecoat material dispersed in said second layer.

5. A plywood panel according to claim 4, having a top coat material layer.

6. A plywood panel according to claim 4, having a groove colorant between the first and second layers.

7. A plywood panel according to claim 4, in which the filler and basecoat materials comprise latex.

8. A plywood panel according to claim 7, in which the second, basecoat layer is imprinted with at least one coat of ink to create a decorative woodgrain appearance.

9. A plywood panel according to claim 8, having a top coat material layer.

10. A plywood panel according to claim 9, having a groove colorant between the first and second layers.

* * * * *

UNITED STATES PATENT OFFICE
CERTIFICATE OF CORRECTION

Patent No. 4,068,031     Dated   January 10, 1978

Inventor(s)   James Cooley et al.

It is certified that error appears in the above-identified patent and that said Letters Patent are hereby corrected as shown below:

Column 2, line 65, "claim 2" should read -- claim 1 --.

Signed and Sealed this

Seventeenth Day of October 1978

[SEAL]

Attest:

RUTH C. MASON
Attesting Officer

DONALD W. BANNER
Commissioner of Patents and Trademarks